(12) United States Patent
Mehendale et al.

(10) Patent No.: US 12,394,014 B2
(45) Date of Patent: Aug. 19, 2025

(54) APPARATUS AND METHOD FOR EFFICIENT MOTION ESTIMATION

(71) Applicant: TEXAS INSTRUMENTS INCORPORATED, Dallas, TX (US)

(72) Inventors: Mahesh M. Mehendale, Bangalore (IN); Ajit Deepak Gupte, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/379,249

(22) Filed: Oct. 12, 2023

(65) Prior Publication Data

US 2024/0037700 A1 Feb. 1, 2024

Related U.S. Application Data

(63) Continuation of application No. 17/411,844, filed on Aug. 25, 2021, now Pat. No. 11,790,485, which is a
(Continued)

(30) Foreign Application Priority Data

May 4, 2016 (IN) .............................. 201641015446

(51) Int. Cl.
*G06T 7/238* (2017.01)
*G06T 3/4007* (2024.01)
(Continued)

(52) U.S. Cl.
CPC ............ *G06T 3/4007* (2013.01); *G06T 7/238* (2017.01); *H04N 19/43* (2014.11); *H04N 19/523* (2014.11);
(Continued)

(58) Field of Classification Search
CPC ................... G06T 3/4007; G06T 7/238; G06T 2207/10016; G06T 2207/20021; H04N 19/43; H04N 19/523
See application file for complete search history.

(56) References Cited

U.S. PATENT DOCUMENTS 6,026,217 A * 2/2000 Adiletta ............... H04N 19/159
709/247
7,782,951 B2 * 8/2010 Muthukrishnan ...... H04N 19/53
375/240.15
(Continued)

FOREIGN PATENT DOCUMENTS

WO WO2016160608 A1 10/2016

OTHER PUBLICATIONS

Grzegorz Pastuszak et al., "Optimization of the Adaptive Computationally-Scalable Motion Estimation and Compensation for Hardware H.264/AVC Encoder" DOI 10.1007/s 11265-015-1021-5; J Sign Process Syst. Jul. 21, 2015 at Springerlink.com (Year: 2015) (Year: 2015).*
(Continued)

*Primary Examiner* — Dramos Kalapodas
(74) *Attorney, Agent, or Firm* — Carl G. Peterson; Frank D. Cimino

(57) ABSTRACT

The architecture shown can perform global search, local search and local sub pixel search in a parallel or in a pipelined mode. All operations are in a streaming mode without the requirement of external intermediate data storage.

20 Claims, 5 Drawing Sheets

Related U.S. Application Data continuation of application No. 16/809,052, filed on Mar. 4, 2020, now Pat. No. 11,127,114, which is a continuation of application No. 15/586,600, filed on May 4, 2017, now Pat. No. 10,593,015.

(51) Int. Cl.
*H04N 19/43* (2014.01)
*H04N 19/523* (2014.01)

(52) U.S. Cl.
CPC ............... *G06T 2207/10016* (2013.01); *G06T 2207/20021* (2013.01)

(56) References Cited

U.S. PATENT DOCUMENTS

| | | | |
|---|---|---|---|
| 9,699,456 B2 | 7/2017 | Chien et al. | |
| 9,872,044 B2* | 1/2018 | Nandan | H04N 19/86 |
| 9,918,102 B1 | 3/2018 | Kohn et al. | |
| 10,187,655 B2* | 1/2019 | Chou | H04N 19/147 |
| 2008/0059467 A1* | 3/2008 | Bivolarski | G06F 9/3885 |
| | | | 712/E9.05 |
| 2013/0208796 A1 | 8/2013 | Amitay et al. | |
| 2015/0084970 A1* | 3/2015 | Schaub | H04N 19/423 |
| | | | 345/506 |
| 2015/0195524 A1* | 7/2015 | Li | H04N 19/46 |
| | | | 375/240.02 |
| 2016/0021385 A1* | 1/2016 | Chou | H04N 19/513 |
| | | | 375/240.16 |
| 2016/0105682 A1* | 4/2016 | Rapaka | H04N 19/50 |
| | | | 375/240.12 |
| 2018/0255311 A1 | 9/2018 | Esenlik et al. | |

OTHER PUBLICATIONS

Kashi Viswanatha Reddy, "Fast Block Matching Motion Estimation Algorithms for Video Compression", 2013; NIT ROURKELA-769008 (Year; 2013) (Year: 2013).*

Kashi Viswanatha Reddy, "Fast Block Matching Motion Estimation Algorithms for Video Compression", 2013; NIT ROURKELA-769008 (Year; 2013).

Martin Schwalb et al., "Fast Motion Estimation on Graphics Hardware for H.264 Video Encoding", 10.1109/TMM.2008.2008873(c) 2009 IEEE (Year; 2009).

Francis Kelly et al., "Fast Image Interpolation for Motion estimation Using Graphics Hardware", Proc. SPIE 5297, Real-Time Imaging VIII (May 18, 2004); doi: 10:1117/12.526400 (Year 2004).

Lawrence Chan et al., "Parallelizing H.264 Motion Estimation Algorithm using CUDA" IAP-MIT 2009 (Year: 2009).

Grzegorz Pastuszak et al., "Optimization of the Adaptive Computationally-Scalable Motion Estimation and Compensation for Hardware H.264/AVC Encoder" DOI 10.1007/s 11265-015-1021-5; J Sign Process Syst. Jul. 21, 2015 at Springerlink.com (Year: 2015).

Cor Meenderinck et al., "Parallel Scalability of Video DEcoders"; DOI 10.1007/s 11265-008-0256-9 (c) Meendenrinck (Year: 2008).

* cited by examiner (1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

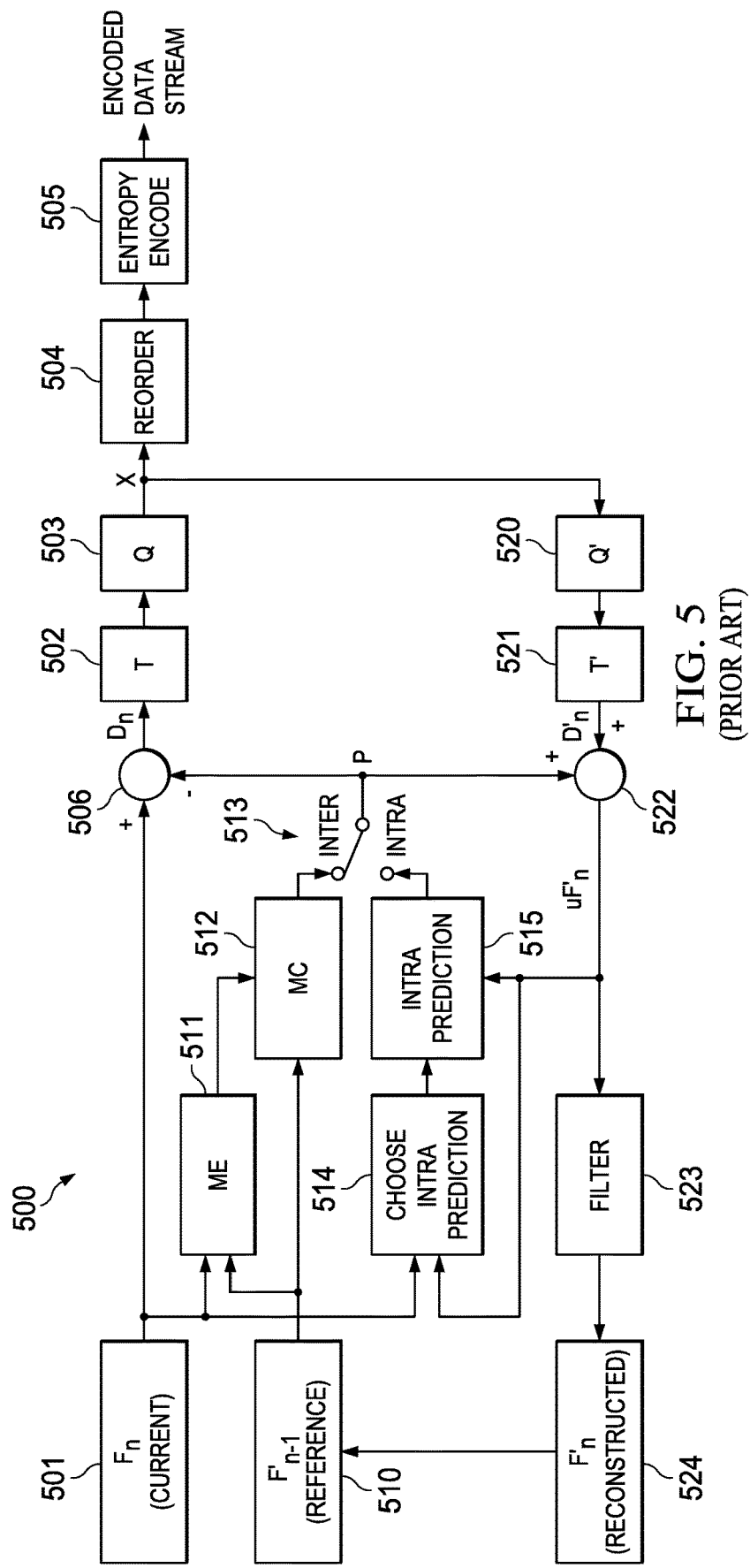

APPARATUS AND METHOD FOR EFFICIENT MOTION ESTIMATION

CROSS-REFERENCE TO RELATED APPLICATIONS

This application is a continuation of U.S. patent application Ser. No. 17/411,844, filed Aug. 25, 2021, and scheduled to grant as U.S. Pat. No. 11,790,485 on Oct. 17, 2023, which is a continuation of U.S. patent application Ser. No. 16/809,052, filed Mar. 4, 2020 (now U.S. Pat. No. 11,127,114), which is a continuation of U.S. patent application Ser. No. 15/586,600, filed May 4, 2017 (now U.S. Pat. No. 10,593,015), which claims priority under 35 U. S.0 119(e)(1) to Indian Provisional Application No. 201641015446, filed May 4, 2016, each of which is herein incorporated by reference in its entirety.

TECHNICAL FIELD OF THE INVENTION

The technical field of this invention is image compression.

BACKGROUND OF THE INVENTION

Increasing video resolution and frame rates, along with large number of searching and matching operations involved in motion estimation demand very high performance. While high performance can be achieved by increasing hardware throughput and higher clock frequency, it is important to identify and exploit parallelism present in the algorithm in order to efficiently utilize available hardware resources.

The Motion Estimation process involves searching operations which require accessing large amounts of reference picture data from memory. Memory bandwidth is an expensive resource which often limits the computational parallelism that can be built in hardware. Further, this large data traffic from the memory leads to large power dissipation.

Motion estimation finds a best match for each block in a current video frame among blocks from previously coded frame(s) (called as reference frames). Block size is typically 16×16 pixels.

A widely used metric to define the match is SAD (Sum Of Absolute Difference in all the pixel values of current block and a reference block).

The best match information is indicated by the motion vector: if the current position of a block is (16,16) then motion vector (4,1) means the best match lies at position (20,17) in the reference frame.

The motion vector can also be in fraction pixel precision: half pixel, quarter pixel etc.

Fractional pixels are calculated by interpolating neighboring integer position pixels.

A motion estimation algorithm would typically include these steps:
Stage 1: choosing best among a few predictor motion vectors;
Stage 2: search around winner of Stage 1;
Stage 3, 4: search around winner of Stage 2 and Stage 3 respectively;
Stage 5: sub-pixel search at interpolated positions.

SUMMARY OF THE INVENTION

A parallel motion estimation architecture is shown that enables efficient utilization of computational resources by making use of the inherent parallelism of the motion estimation algorithms.

BRIEF DESCRIPTION OF THE DRAWINGS

These and other aspects of this invention are illustrated in the drawings, in which:

FIG. 4 illustrates the instruction syntax of the very long instruction word digital signal processor core illustrated in FIG. 2 (prior art);

FIG. 5 illustrates an overview of the video encoding process of the prior art;

DETAILED DESCRIPTION OF PREFERRED EMBODIMENTS

Figure 1:
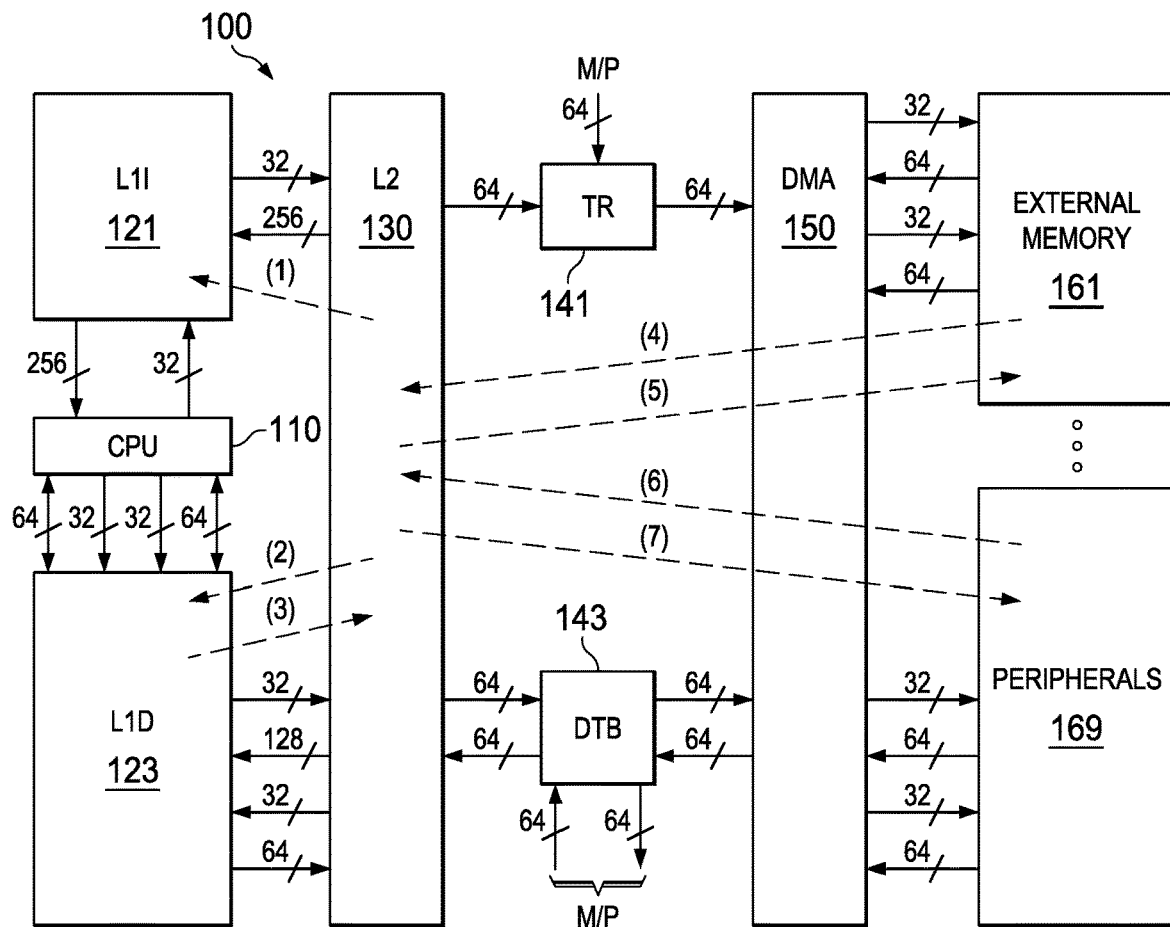
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
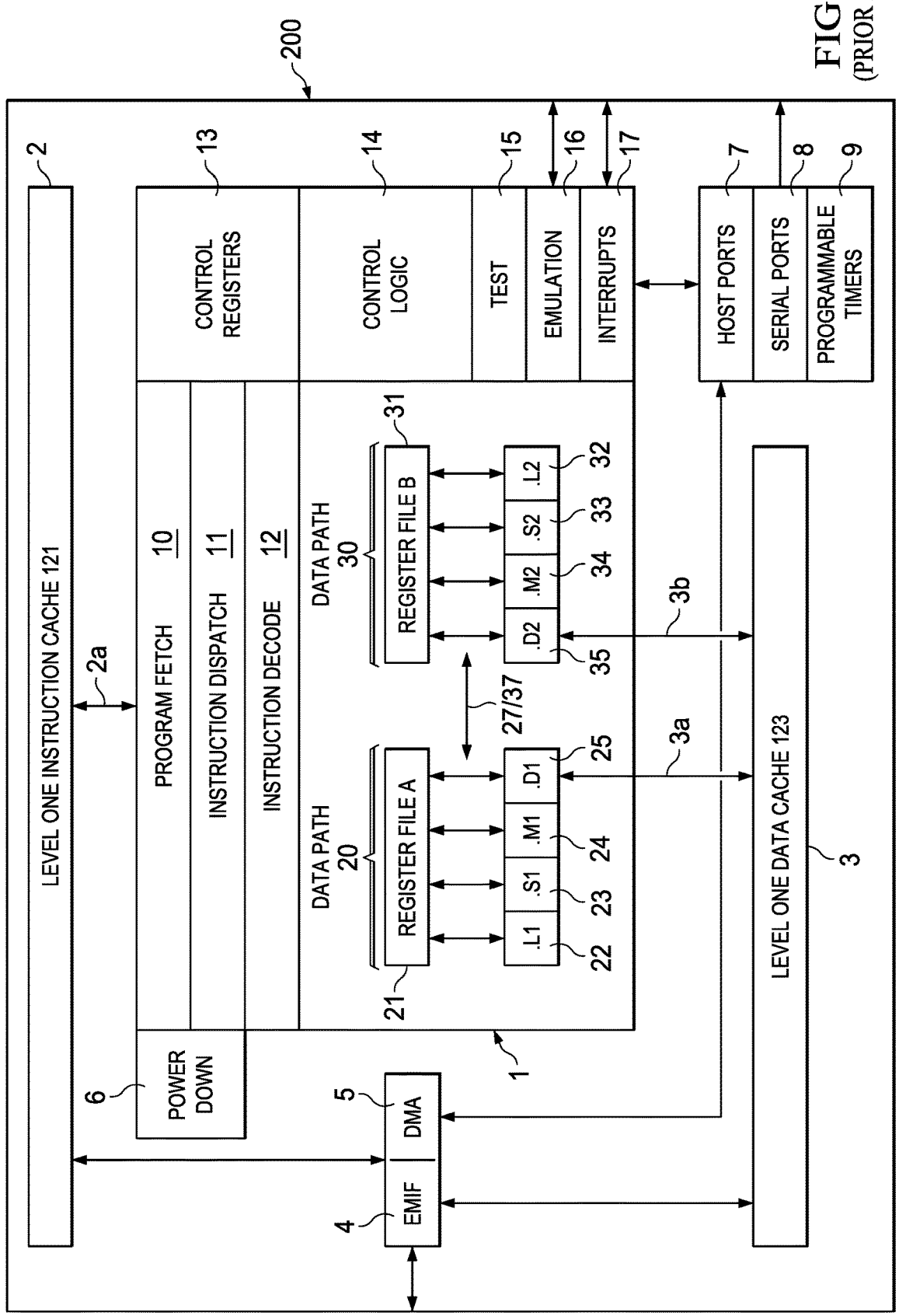
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
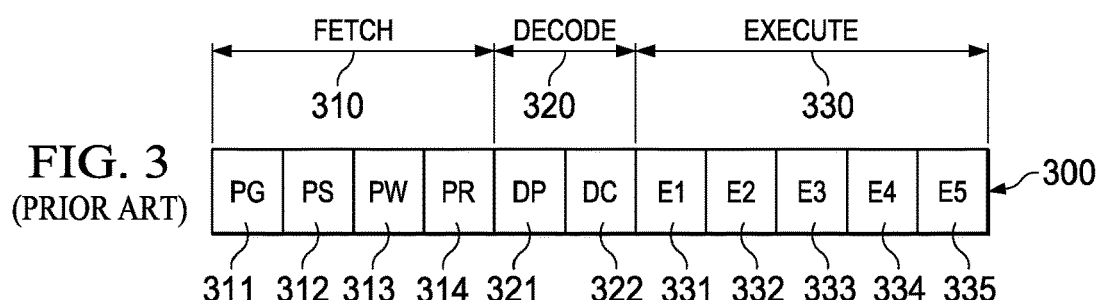
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 2 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 2 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the encoding process 500 of video encoding according to the prior art. Many video encoding standards use similar processes such as represented in FIG. 5. Encoding process 500 begins with the n th (current) frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded data that must be transmitted and/or stored. The resulting entropy encoded data is the encoded data stream. This invention concerns content adaptive binary arithmetic coding (CABAC) which will be further described below.

Video encoding standards typically permit two types of predictions. In inter-frame prediction, data is compared with data from the corresponding location of another frame. In intra-frame prediction, data is compared with data from another location in the same frame.

For inter prediction, data from n-1th (previous) frame $F_{n-1}$ 510 and data from the n th frame $F_n$ 501 supply motion estimation block 511. Motion estimation block 511 determines the positions and motion vectors of moving objects within the picture. This motion data is supplied to motion compensation block 512 along with data from n-1th frame $F_{n-1}$ 510. The resulting motion compensated frame data is selected by switch 513 for application to subtraction unit 506. Subtraction unit 506 subtracts the inter prediction data from switch 513 from the input frame data from n th frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If then th frame $F_n$ and the n-1 th frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of the current frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from n th frame $F_n$ 501 and the output of addition unit 522. Choose intra prediction unit 514 signals intra prediction intra predication unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the n-th frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

Figure 6:
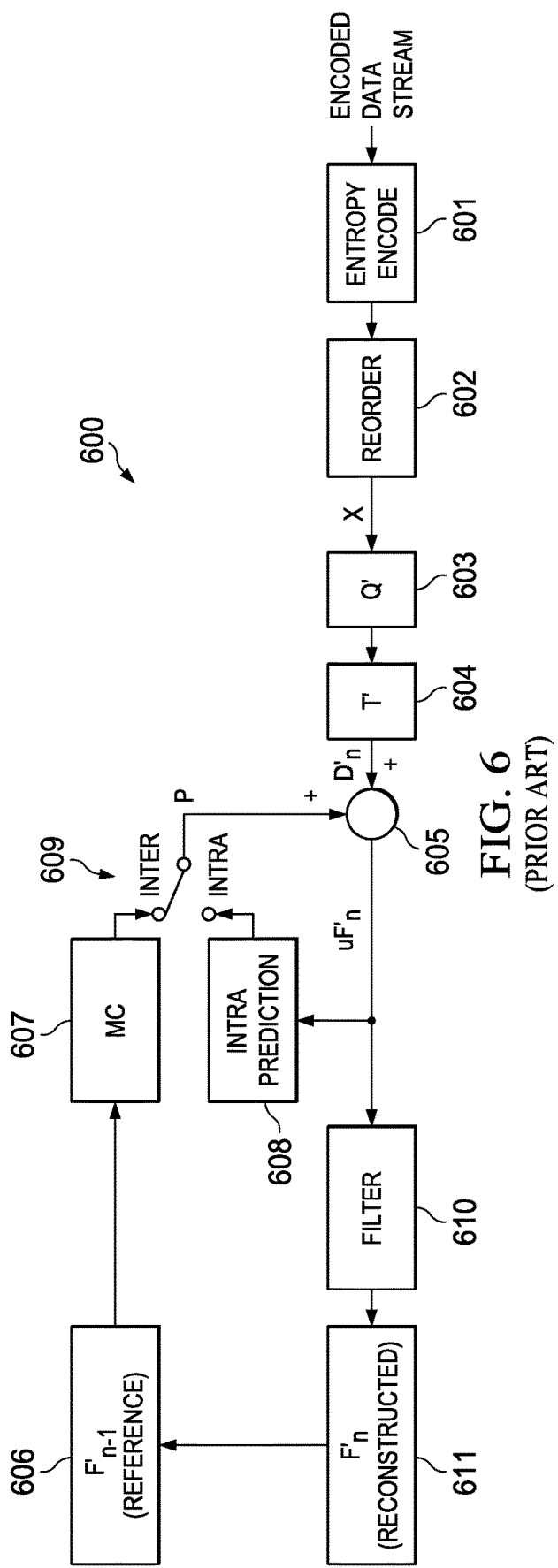
FIG. 6 illustrates an overview of the video decoding process of the prior art.

FIG. 6 illustrates the corresponding decoding process 600. Entropy decode unit 601 receives the encoded data stream. Entropy decode unit 601 recovers the symbols from the entropy encoding of entropy encoding unit 505. This invention is applicable to CABAC decoding. Reorder unit 602 assembles the macroblocks in raster scan order reversing the reordering of reorder unit 504. Inverse quantization block 603 receives the quantized data from reorder unit 602 and substantially recovers the original frequency domain data. Inverse frequency transform block 604 transforms the frequency domain data from inverse quantization block 603 back to the spatial domain. This spatial domain data supplies one input of addition unit 605. The other input of addition input 605 comes from switch 609. In inter prediction mode switch 609 selects the output of motion compensation unit 607. Motion compensation unit 607 receives the reference frame $F'_{n-1}$ 606 and applies the motion compensation computed by motion compensation unit 512 and transmitted in the encoded data stream.

Switch 609 may also select an intra prediction mode. The intra prediction is signaled in the encoded data stream. If this is selected, intra prediction unit 608 forms the predicted data from the output of adder 605 and then applies the intra prediction computed by intra prediction block 515 of the encoding process 500. Addition unit 605 recovers the predicted frame. As previously discussed in conjunction with encoding, it is possible to transmit an unpredicted or I frame. If the data stream signals that a received frame is an I frame, then the predicted frame supplied to addition unit 605 is all 0's.

The output of addition unit 605 supplies the input of deblock filter 610. Deblock filter 610 smoothes artifacts created by the block and macroblock nature of the encoding process. The result is reconstructed frame $F'_n$ 611. As shown schematically in FIG. 6, this reconstructed frame $F'_n$ 611 becomes the next reference frame $F_{n-1}$ 606.

The deblocking filtering of deblock filter 523 and deblock filter 610 must be the same. This enables the decoding process to accurately reflect the input frame $F_n$ 501 without error drift. The H.264 standard has a specific, very detailed decision matrix and corresponding filter operations for this process. The standard deblock filtering is applied to every macroblock in raster scan order. This deblock filtering smooths artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

The architecture shown in this invention enables efficient utilization of computational hardware by making use of the inherent parallelism in the motion estimation algorithm. Two types of parallelism are exploited: (1) For a given current macro-block, search operations in different reference frames are independent of each other and can be performed in parallel (or pipelined fashion). (2) Search operations for two different macro-blocks can be performed in parallel.

Motion estimation algorithms many times involve a global search followed by a local search phase. Global search narrows down the search to one (or more) motion vector candidates among several initial candidates. The local search that comes afterwards involves searching in a region just around the candidate(s) identified during the global search phase. Further, local search typically involves integer motion vector search and fractional (sub-pixel) motion vector search.

Figure 7:
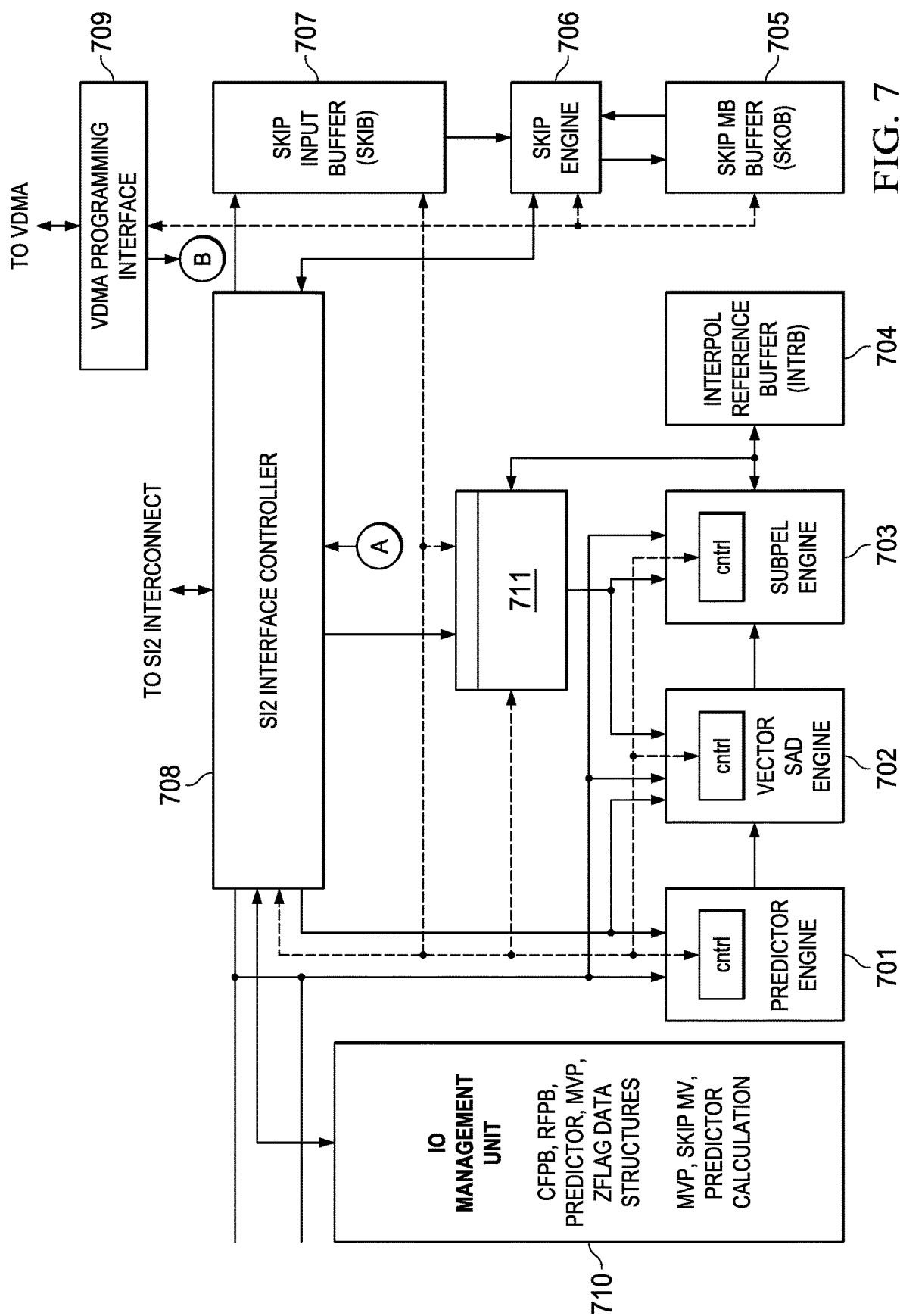
FIG. 7 illustrates an overview of the motion estimation engine of this invention.

The architecture shown in FIG. 7 provides parallel hardware comprising of:

Interface controller 708 connected to processing unit 711, skip engine 706, skip input buffer 707, I/O management unit 710, predictor engine 701, vector SAD engine 702 and subpel engine 703.

Programming interface 709 is connected to skip engine 706 and skip buffer 705.

I/O management unit 710 is connected to interface controller 708, predictor engine 701, vector SAD engine 702 and subpel engine 703.

Processing unit 711 is connected to interface controller 708, predictor engine 701, vector SAD engine 702, subpel engine 703 and interpolation reference buffer 704.

Predictor engine 701 is connected to interface controller 708, vector SAD engine 702 and subpel (sub pixel) engine 703.

Subpel engine 703 is connected vector SAD engine 702, predictor engine 701, interpolation reference buffer 704, processing unit 711 and interface controller 708.

Vector SAD engine is connected to predictor engine 701, subpel engine 703, processing unit 711 and interface controller 708.

Skip engine 706 is connected to interface controller 708, skip input buffer 707, skip MB buffer 705 and programming interface 709.

Buffers 704, 705 and 707 allow the implementation of global search, local integer search and local sub-pixel search operations in parallel. With this architecture, searches in multiple reference frames can also be performed in pipelined fashion, as shown in Table 2. This table shows L0 and L1 (forward and backward) direction search in B frame processing. After completing predictor search (global search) in L0 direction, local integer search (also called vector search) in L0 direction and global search in L1 direction happen in parallel. Similarly, local integer search in L1 direction happens in parallel with local sub pixel search in Ldirection.

A separate sub pixel interpolation and cost calculation engine 703 is used to calculate skip and direct mode costs as defined in H.264 standard.

TABLE 2

| Predictor Search | Vector Search | Sub Pixel Search | Skip SAD |
|---|---|---|---|
| MBnL0 | | | |
| MBnL1 | MBnL0 | | MBnL0 |
| | MBnL1 | MBnL0 | MBnL1 |
| | | MBnL1 | |
| MBn + 1 L0 | | | |
| MBn + 1 L1 | MBn + 1 L0 | | MBn + 1 L0 |
| | MBn + 1 L1 | MBn + 1 L0 | MBn + 1 L1 |
| | | MBn + 1 L1 | |

TABLE 3

| Predictor Search | Vector Search | Sub Pixel Search | Skip Sad |
|---|---|---|---|
| | MBnL0 | | |
| MBn + 1 L0 | MBnL1 | MBnL0 | MBnL0 |
| MBn + 1 L1 | | MBnL1 | MBnL1 |
| | MBn + 1 L0 | | |
| MBn + 2 L0 | MBn + 1 L1 | MBn + 1 L0 | MBn + 1 L0 |
| MBn + 2 L1 | | MBn + 1 L1 | MBn + 1 L1 |

For optimizing memory bandwidth, the architecture uses local buffers 704, 705 and 707 to store the reference data required for portions of the search. The local buffers also free up memory ports and thus enable more parallel operations.

Figure 8:
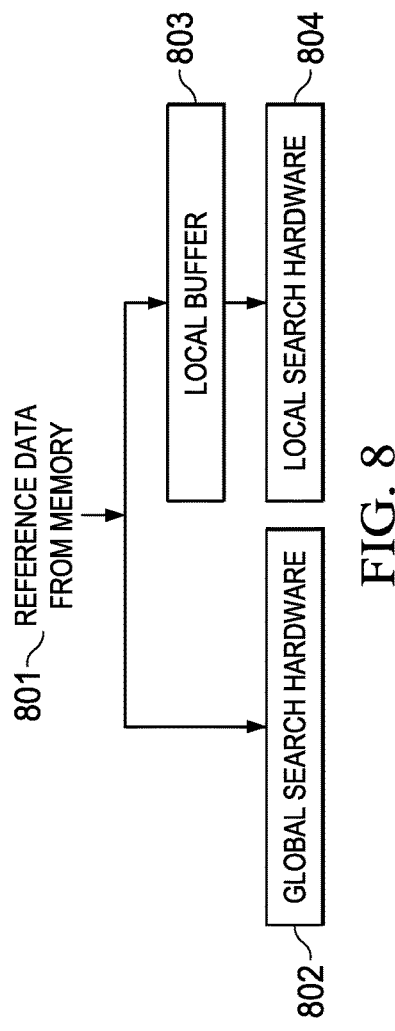
FIG. 8 illustrates one of the local buffers.

During local search, as shown in FIG. 8, the same reference pixels are repeatedly accessed from the memory 801 by the search engine 804. We take advantage of this fact and store all the data that may be required to perform the local search in custom designed local buffers 803 inside the search engine. Since the local search pattern is be known ahead of time, a bounded region of reference pixels required for local search around the starting point of local search (referred as LS_start_mv) can be identified.

After performing global search, before starting local search this bounded region is fetched from the memory and stored inside a buffer local to the motion estimation engine. Entire local search is then carried out by accessing reference data from the local buffer instead of fetching from the main memory. This significantly reduces the amount of data required to be fetched from the memory, thereby saving power and freeing up memory bandwidth.

More than one instance of local buffers may be included in the design to store more than one reference region required for local search. These reference regions may belong to either the same or to different reference frames.

In addition to storing the integer pixel reference data, the local buffer can also be used to store sub-pixel reference data. For example, H.264 standard specifies a 6-tap filter for half pixel calculation and 2-tap filter for quarter pixel calculation. For quarter pixel calculation, half position pixels are required. During the search operation, typically quarter pixel search is performed after half pixel search. The half pixels calculated during half pixel search can be stored in the local buffer so that during quarter pixel search, half pixel positions need not be recalculated.

The invention claimed is:
1. A device comprising:
a vector engine;
a sub-pixel engine; and
a predictor engine configured to:
during a first processing cycle, perform a first global search based on a first macroblock of a first frame to identify a first set of candidate macroblocks of a first reference frame that correspond to the first macroblock; and
during a second processing cycle, perform a second global search based on the first macroblock to identify a second set of candidate macroblocks of a second reference frame that correspond to the first macroblock, wherein the vector engine is configured to:
during the second processing cycle, perform a first local integer search in a first direction based on the first set of candidate macroblocks in parallel with the second global search; and
during a third processing cycle, perform a second local integer search in a second direction based on the second set of candidate macroblocks, wherein the sub-pixel engine is configured to:
during the third processing cycle, perform a first local fractional search in the first direction based on the first set of candidate macroblocks in parallel with the second local integer search; and
during a fourth processing cycle, perform a second local fractional search in the second direction based on the second set of candidate macroblocks, and
wherein the device is configured to determine a motion vector for the first macroblock relative to the first set of candidate macroblocks or the second set of candidate macroblocks based on the first and second global searches, further based on the first and second local integer searches, and further based on the first and second local fraction searches,
Specifically, Chou, Schaub, or Murali do not teach the amended claims where the specific limitations of parallel four processing cycles, reciting inter alia; wherein the device is configured to determine a motion vector for the first macroblock relative to the first set of candidate macroblocks or the second set of candidate macroblocks based on the first and second global searches, further based on the first and second local integer searches, and further based on the first and second local fraction searches.

2. The device of claim 1, further comprising a skip engine configured to:
during the second processing cycle, determine a first sum of absolute differences (SAD) value between the first macroblock and the first set of candidate macroblocks; and
during the third processing cycle, perform a second determination of a SAD value between the first macroblock and the second set of candidate macroblocks.

3. The device of claim 1, wherein the first local fractional search comprises a half-pixel search.

4. The device of claim 1, wherein the first local fractional search comprises a quarter-pixel search.

5. The device of claim 1, wherein the first, second, third, and fourth processing cycles are consecutive cycles.

6. The device of claim 1,
wherein to perform the first local integer search, the vector engine is configured to search a region of the first reference frame around the first set of candidate macroblocks, and
wherein to perform the second local integer search, the vector engine is configured to search a region of the second reference frame around the second set of candidate macroblocks.

7. The device of claim 1, wherein to perform the first global search, the predictor engine is configured to identify a third set of candidate macroblocks of a third reference frame that correspond to the first macroblock.

8. The device of claim 1, wherein the first reference frame is prior to the first frame.

9. The device of claim 1, wherein the predictor engine is further configured to perform a third global search based on a second macroblock of the first frame using an approximation of the motion vector for the first macroblock.

10. The device of claim 1, wherein to determine the motion vector, the device is configured to determine a best match based on a vector sum of absolute differences (SAD).

11. The device of claim 10, wherein the device is configured to determine the motion vector based on the SAD between the first macroblock and a first candidate macroblock or the SAD between the first macroblock and a second candidate macroblock.

12. A method comprising:
during a first processing cycle, performing a first global search based on a first macroblock of a first frame to identify a first set of candidate macroblocks of a first reference frame that correspond to the first macroblock; and
during a second processing cycle, performing a second global search based on the first macroblock to identify a second set of candidate macroblocks of a second reference frame that correspond to the first macroblock;
during the second processing cycle, performing a first local integer search in a first direction based on the first set of candidate macroblocks in parallel with the second global search; and
during a third processing cycle, performing a second local integer search in a second direction based on the second set of candidate macroblocks,
during the third processing cycle, performing a first local fractional search in the first direction based on the first set of candidate macroblocks in parallel with the second local integer search; and
during a fourth processing cycle, performing a second local fractional search in the second direction based on the second set of candidate macroblocks, and
determining a motion vector for the first macroblock relative to the first set of candidate macroblocks or the second set of candidate macroblocks based on the first and second global searches, further based on the first and second local integer searches, and further based on the first and second local fraction searches.

13. The method of claim 12, further comprising:
during the second processing cycle, determine a first sum of absolute differences (SAD) value between the first macroblock and the first set of candidate macroblocks; and
during the third processing cycle, perform a second determination of a SAD value between the first macroblock and the second set of candidate macroblocks.

14. The method of claim 12, wherein the first local fractional search comprises a half-pixel search or a quarter-pixel search.

15. The method of claim 12, wherein the first, second, third, and fourth processing cycles are consecutive cycles.

16. The method of claim 12,
wherein performing the first local integer search comprises searching a region of the first reference frame around the first set of candidate macroblocks, and
wherein performing the second local integer search comprises searching a region of the second reference frame around the second set of candidate macroblocks.

17. The method of claim 12, wherein the method further comprises performing a third global search based on a second macroblock of the first frame using an approximation of the motion vector for the first macroblock.

18. The method of claim 12,
wherein determining the motion vector comprises determining a best match based on a vector sum of absolute differences (SAD), and
wherein determining the motion vector is based on the SAD between the first macroblock and a first candidate macroblock or the SAD between the first macroblock and a second candidate macroblock.

19. A device comprising:
a vector engine;
a sub-pixel engine; and
a predictor engine configured to:
during a first processing cycle, perform a first global search based on a first macroblock of a first frame to identify a first set of candidate macroblocks of a first reference frame that correspond to the first macroblock, wherein the first reference frame is prior to the first frame;
during a second processing cycle, perform a second global search based on the first macroblock to identify a second set of candidate macroblocks of a second reference frame that correspond to the first macroblock; and
perform a third global search based on a second macroblock of the first frame using an approximation of a motion vector for the first macroblock, wherein the vector engine is configured to:
during the second processing cycle, perform a first local integer search in a first direction based on the first set of candidate macroblocks in parallel with the second global search; and
during a third processing cycle, perform a second local integer search in a second direction based on the second set of candidate macroblocks,
wherein the sub-pixel engine is configured to:
during the third processing cycle, perform a first local fractional search in the first direction based on the first set of candidate macroblocks in parallel with the second local integer search; and
during a fourth processing cycle, perform a second local fractional search in the second direction based on the second set of candidate macroblocks, and
wherein the first, second, third, and fourth processing cycles are consecutive cycles, and
wherein the device is configured to determine the motion vector for the first macroblock relative to the first set of candidate macroblocks or the second set of candidate macroblocks based on the first and second global searches, further based on the first and second local integer searches, and further based on the first and second local fraction searches.

20. The device of claim 19, further comprising a skip engine configured to:
during the second processing cycle, determine a first sum of absolute differences (SAD) value between the first macroblock and the first set of candidate macroblocks; and
during the third processing cycle, perform a second determination of a SAD value between the first macroblock and the second set of candidate macroblocks.

* * * * *